United States Patent [19]
Koehler et al.

[11] 4,437,528
[45] Mar. 20, 1984

[54] VEHICLE WITH VARIABLE UNDERCARRIAGE GEOMETRY

[75] Inventors: Wolfgang Koehler, Karlsruhe; Hans-Joachim Blocher, Metzingen; Eberhard Weiss, Pfullingen, all of Fed. Rep. of Germany

[73] Assignee: Kernforschungszentrum Karlsruhe, Karlsruhe, Fed. Rep. of Germany

[21] Appl. No.: 387,971

[22] Filed: Jun. 14, 1982

[30] Foreign Application Priority Data

Nov. 25, 1981 [DE] Fed. Rep. of Germany ....... 3146661

[51] Int. Cl.³ .............................................. B62D 55/00
[52] U.S. Cl. .................................................... 180/9.5
[58] Field of Search ...................... 180/9.5, 9.62, 9.46, 180/9.2 R, 6.48, 6.5; 305/16

[56] References Cited

U.S. PATENT DOCUMENTS 2,842,340 7/1958 Burress ................................ 180/9.5
3,177,961 4/1965 Potter ................................... 180/9.5

Primary Examiner—John A. Pekar

[57] ABSTRACT

A vehicle with a variable undercarriage geometry has two elongated undercarriage support beams which are pivotally supported at one end at opposite sides of a vehicle body by means of pivot motors connected to the vehicle body and extending into and pivotally supporting the support beams, the pivot motors being operatively connected to the support beams through reduction gear units for pivoting the support beams and drive motors are disposed at the free ends of the support beams and have drive wheels rotatably supported on their housings and operatively connected to the drive motor for the propulsion of the vehicle, both pivot and drive motors being disposed essentially within the outlines of said undercarriages.

4 Claims, 3 Drawing Figures

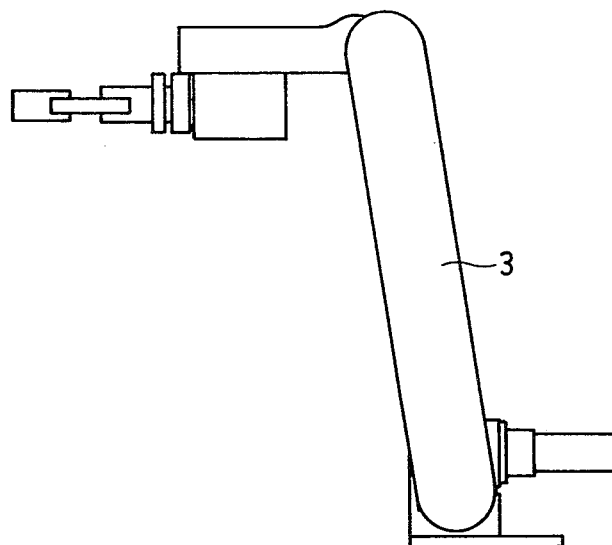
Fig. 1
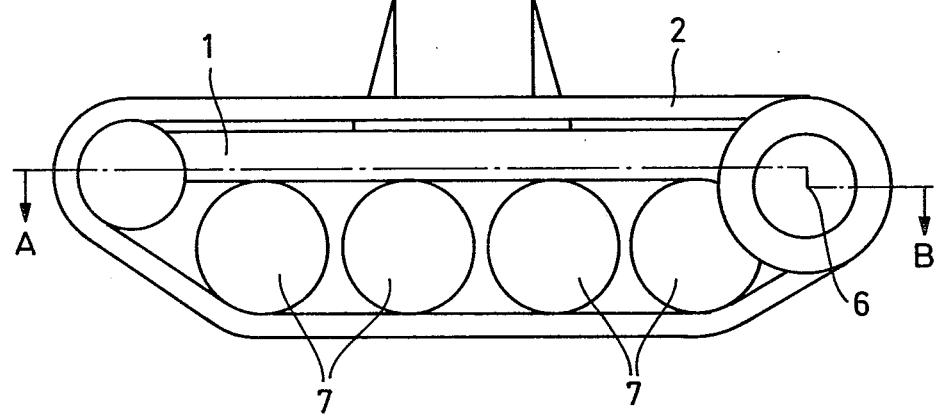
Fig. 2
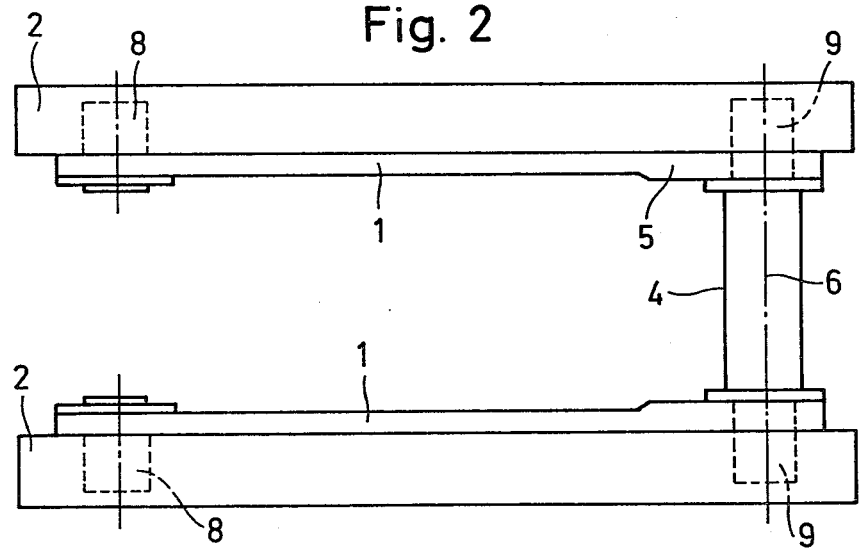

VEHICLE WITH VARIABLE UNDERCARRIAGE GEOMETRY

BACKGROUND OF THE INVENTION

The invention relates to a vehicle with variable undercarriage geometry having elongated drive chain or roller support structures pivotally linked to the vehicle body.

A similar vehicle is known from German DOS No. 2231057. This vehicle is provided with motors for the propulsion and pivoting of the undercarriage, which motors are disposed within the vehicle body where they take up a substantial amount of the space available in the tub-like vehicle body. Also, the center of gravity of the vehicle is relatively high since any additional necessary equipment needs to be arranged above the drive motors which reduces the stability of the vehicle during operation. It would be advantageous if such a vehicle with variable undercarriage geometry would have a body free of any drive means such that all the space and area within the body would be usable.

SUMMARY OF THE INVENTION

In a vehicle with variable undercarriage geometry two elongated undercarriage support beams are pivotally supported at opposite sides of a vehicle body on the housings of pivot motors which are mounted on the vehicle body but project into the undercarriage beams and have outputs operatively connected to the support beams through reduction gear units for pivoting the support beams. Drive motors are arranged at the free ends of the support beams with drive wheels rotatably supported on the drive motors and operatively connected to the output of the drive motors for propulsion of the vehicle, both pivot and drive motors being disposed essentially within the outlines of the undercarriage.

SHORT DESCRIPTION OF THE DRAWINGS

FIG. 1 is a schematic side view of a vehicle with variable undercarriage geometry which is equipped with a manipulator, FIG. 2 is a top view of the undercarriage with the vehicle body removed, and FIG. 3 is a cross-sectional view along line A-B of FIG. 1 of one section of the undercarriage.

DESCRIPTION OF THE PREFERRED EMBODIMENT

Figure 3:
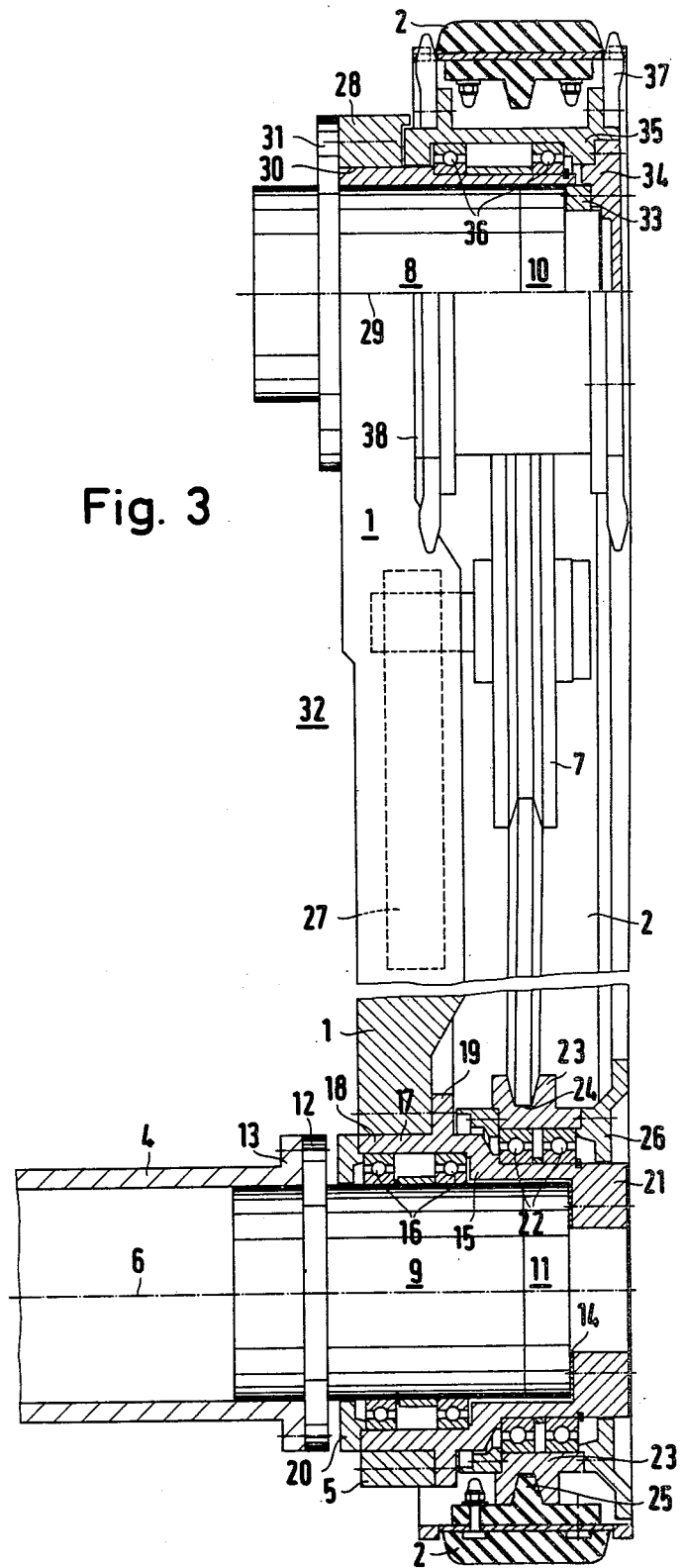

FIG. 1 is a side view of a vehicle with an undercarriage which includes elongated support beams 1 each provided with a chain drive 2. The vehicle carries a manipulator 3 which is not described in detail. FIG. 2 is a top view of the undercarriage wherein the support beams 1 are shown interconnected by a tubular frame member 4 (being part of, and representing, a vehicle body) mounted to one end 5 of and interconnecting the support beams. The tubular member 4 may be the vehicle body or a part of it and is concentric with the pivot axis 6 of the undercarriage support beams 1, which are pivotal about the pivot axis 6 in a manner to be described later. A tub-like body, which is not shown in FIG. 2, is mounted on the tubular member 4 and encloses the vehicle internal structure. The drive chain 2 is guided along the bottom loop by support wheels 7 mounted on spring-supported arms 1. The vehicle includes four motors, one drive motor 8 and one pivot motor 9 being associated with each of the elongated support beams 1 and chain drive 2. The two chain drives and support beams are symmetrically arranged with respect to the longitudinal vehicle axis. They are described in greater detail on the basis of FIG. 3 which is an enlarged cross-sectional view of the right-hand support beam of FIG. 1.

It is noted however that the undercarriage may well have four support beams which are all independently pivotally supported, each having its own drive means. For this purpose, the vehicle may have a second axle corresponding to the pivot axis 6 but being spaced therefrom.

The most important aspect of the present invention is that the drive motor 8 as well as the pivot motor 9 as well as their speed reducing gears 10, 11 are disposed within the undercarriage and not within the vehicle body or within its confinements.

The undercarriage support beam 1 is an elongated member which has the pivot axis 6 extending therethrough at one end 5 thereof, the support beam 1 being supported pivotally about the pivot axis 6. The means for pivoting the beam 1 is the pivot motor 9 which has a flange 12 connected to the flange 13 of the tubular frame member 4. Mounted on the pivot motor 9 at its end remote from the tubular frame member 4 is a coaxial reduction gear until 11 whose output member is an annular element 14 (not shown in detail) by which rotation of the motor, or rather the gear unit, is transmitted to a drive bell 15 which is threaded onto the annular element 14 and extends backward over and surrounds the housing of the pivot motor 9 where it is rotatably supported by antifriction bearings 16. The support beam 1 is mounted on the free end 17 of the drive bell 15 around the bearings 16, the bell 15 extending through an opening 18 in the beam 1 which is bolted to a shoulder 19 of the bell 15. An annular cover 20 is mounted on the end of the bell to seal off the bearings 16. As a result, rotation of the pivot motor 9 will cause pivoting of the support beam 1 about its pivot axis about the axis of the pivot motor 9 and the tubular frame member 4. At its end 21 opposite the support beam 1, the drive bell 15 has a guide wheel 23 rotatably supported by antifriction bearings 22. The guide wheel 23 has grooves 24 receiving a guide shoulder 25 of the drive chain 2. At the outer side, the drive structure including bearings 22 and guide wheel 23 are covered by a protective disc 26. The bearings 16 and the bearings 22 should be arranged as close together as possible in order to reduce moments of flexure. Pivot motor 9, drive bell 15 and guide wheel 23 are disposed one within the other and are all coaxial with the pivot axis 6 and together form a package of relatively small size determined by the axial length of the drive bell 15 or the motor including gear unit 11.

The support wheels 7 are mounted on spring biased support arms 27 which are linked to the underside of the support beams 1, the drive chain 2 passing under the support wheels 7.

As already mentioned the drive chain 2 is driven by the drive motor 8 which is arranged at the other end 28 of the support beam 1 opposite the pivot motor 9 and is installed along the axis 29. At its end 28 the support beam 1 therefore has an opening 30 into which the motor 8 is inserted until its shoulder 31 abuts the support beam 1 to which it is firmly connected.

The motor 8 is so mounted that its end carrying the speed reducing gear unit 10 projects outwardly from the inside 32 of the support beam 1 such that the major portion of the motor 8 is disposed on the outside 38 of the support beam 1 and within the drive chain 2. The output of the speed reducing gear unit 10 is associated with a rotatable drive ring 33 which is coaxial with the motor 8. A drive sprocket wheel 35 is connected to the drive ring 33 through an intermediate member 34, the sprocket wheel surrounding one end of the motor 8. The drive sprocket wheel 35 is, of course, arranged in the same plane in which the guide sprocket wheel 23 is disposed at the opposite end of the support beam 1. The drive sprocket wheel 35 is rotatably supported on the drive motor 8 by means of antifriction bearings 36 while it surrounds the drive motor 8 like a bell.

Since both, the drive motor 8 and the pivoting motor 9 are inserted into the support beam 1 from the inside of the support beam 1 and since the drive elements 15 and 35 surround the motors 8 and 9 the undercarriage structure takes up only a relatively small space. The motors and all associated elements are practically disposed within the space surrounded by the drive chain 2 and delineated by the support beam 1.

As already mentioned, pivoting of the support beam 1 about axis 6 is achieved by operation of pivot motor 9. When the motor 9 is energized, the annular element 14 is rotated, rotating therewith the drive bell 15. Since the support beam 1 is connected to the drive bell 15 it is pivoted in the process.

For propulsion, the drive motor 8 is energized. The drive ring 33 is rotated by the motor 8 and rotates the drive sprocket wheel 35. The sprockets 37 of the sprocket wheel 35 are in engagement with the drive chain 2 which is carried over the support wheels 7 and around the guide sprocket wheel while the support wheels roll over the chain 2 as the vehicle is propelled. All four motors 8 and 9 are independently controllable so that the vehicle can perform a multitude of drive maneuvers.

The invention is not limited to the arrangement as described with respect to the drawings. It is, for example, possible that instead of a chain drive a series of wheels is associated with each support beam which may also be driven for example by drive chains.

We claim:

1. A vehicle with variable undercarriage geometry, comprising: a vehicle body, at least two elongated undercarriage support beams pivotally linked to said body, each having propulsion means associated therewith, a pivot motor mounted on said vehicle body and extending into said undercarriage coaxially with the pivoting axis of the associated support beam and being operatively connected to the associated support beam for pivoting said support beam, and a drive motor mounted on said support beam and having an output operatively associated with said propulsion means for operating said propulsion means to propel said vehicle, both pivot and drive motors being disposed essentially within the outline of said undercarriages.

2. A vehicle as claimed in claim 1, wherein the housing of said pivot motor is mounted on the outside of said vehicle body coaxially with the pivot axis of said support beam and projects therefrom, said elongated undercarriage support beam is pivotally supported at one end thereof on said pivot motor housing, said pivot motor has mounted thereon a reduction gear unit having an output element operatively connected to said undercarriage support beam, said drive motor is mounted on said support beam at its other end and projects outwardly therefrom, a drive sprocket wheel for a tracked drive is rotatably supported on said drive motor housing, and a coaxial speed reduction gear unit is associated with said drive motor and has an output drive element which is operatively connected to said drive sprocket wheel.

3. A vehicle as claimed in claim 2, wherein a drive bell is connected to the reduction gear unit output associated with said pivot motor said bell extending backward over, and surrounding, said gear unit and motor housing, said drive bell being rotatably supported on the housing of said pivot motor by a bearing structure arranged in radial alignment with said support beam and said support beam has an opening receiving said motor and being firmly mounted to the free end of said drive bell.

4. A vehicle according to claim 3, wherein a guide wheel is rotatably mounted on said drive bell adjacent its end which is connected to the pivot motor output, and said drive bell, said guide wheel and said pivot motor are all arranged coaxialy with the pivot axis of said support beam and disposed partially adjacent and within one another.

* * * * *